(12) United States Patent
Leykauf et al.

(10) Patent No.: US 11,489,590 B1
(45) Date of Patent: Nov. 1, 2022

(54) OPTICAL LINK AND COHERENT RECEIVER NOISE CHARACTERIZATION

(71) Applicant: Cisco Technology, Inc., San Jose, CA (US)

(72) Inventors: Jörg Leykauf, Heroldsbach (DE); Sonja Schneider, Lehrberg (DE); Israa Slim, Munich (DE); Yi Tang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/315,837

(22) Filed: May 10, 2021

(51) Int. Cl.
*H04B 10/079* (2013.01)
*H04B 10/61* (2013.01)

(52) U.S. Cl.
CPC ..... *H04B 10/07953* (2013.01); *H04B 10/615* (2013.01)

(58) Field of Classification Search
None
See application file for complete search history.

(56) References Cited

U.S. PATENT DOCUMENTS

| | | | | |
|---|---|---|---|---|
| 6,952,529 B1* | 10/2005 | Mittal | ............. | H04B 10/07953 398/33 |
| 7,081,988 B2* | 7/2006 | Charlet | ............. | H04B 10/2941 359/337.13 |
| 7,865,082 B2* | 1/2011 | Honda | ............. | H04B 10/25133 398/33 |
| 7,936,999 B1* | 5/2011 | Hawryluck | .......... | H04L 7/0075 398/208 |
| 7,986,878 B2* | 7/2011 | Saunders | ............ | H04B 10/541 398/25 |
| 8,233,799 B2* | 7/2012 | Lowery | ................. | H04B 10/60 398/208 |
| 8,280,257 B2* | 10/2012 | Yang | ................... | H04J 14/0217 398/79 |
| 9,285,267 B2* | 3/2016 | Gehrke | ................. | H04B 10/61 |
| 9,647,753 B1* | 5/2017 | Kurisu | ................ | H04B 10/614 |
| 9,722,704 B2* | 8/2017 | Saito | ................... | H04B 10/674 |
| 10,044,439 B2* | 8/2018 | Kurisu | ................... | H04J 14/06 |
| 10,256,901 B2* | 4/2019 | Jiang | ............... | H04B 10/07953 |
| 10,454,589 B2* | 10/2019 | Suzuki | .................. | H04B 10/61 |
| 11,095,375 B2* | 8/2021 | Tanaka | .............. | H04B 10/0797 |
| 11,223,385 B1* | 1/2022 | Murakami | .......... | H04B 10/615 |

(Continued)

OTHER PUBLICATIONS

Medhi, Von Neumann Architecture, 2012 (Year: 2012).*

(Continued)

*Primary Examiner* — Jai M Lee
(74) *Attorney, Agent, or Firm* — Edell, Shapiro & Finnan, LLC (57) ABSTRACT

Optical signal to noise ratios that more accurately characterize optical link noise are determined. As noise induced by an optical receiver does not generally vary with an input optical signal power, a power of an incoming optical signal is varied at the receiver. A resulting variation in noise measure represents a variation in link noise and does not include any variation caused by receiver noise, as receiver noise does not generally vary with optical signal power. Thus, the contribution of optical link noise can be discerned from other noise induced by the receiver itself. A more accurate characterization of optical link performance is thus provided.

20 Claims, 7 Drawing Sheets

(56) References Cited

U.S. PATENT DOCUMENTS

| | | | |
|---|---|---|---|
| 2005/0031341 A1 | 2/2005 | Stuart | |
| 2007/0003280 A1* | 1/2007 | Sada | H04B 10/66 398/27 |
| 2011/0249969 A1 | 10/2011 | Ji et al. | |
| 2012/0219285 A1 | 8/2012 | Dahan et al. | |
| 2013/0343751 A1* | 12/2013 | Mamyshev | H04B 10/615 398/202 |
| 2014/0117200 A1* | 5/2014 | Gehrke | H04B 10/61 250/201.1 |
| 2021/0021338 A1* | 1/2021 | Calabrò | H04B 10/61 |

OTHER PUBLICATIONS

Bo Zhang et al., "Design of coherent receiver optical front end for unamplified applications", Optical Society of America, vol. 20, No. 3, Jan. 26, 2012, 10 pages.

\* cited by examiner

OPTICAL LINK AND COHERENT RECEIVER NOISE CHARACTERIZATION

TECHNICAL FIELD

The present disclosure relates to optical network equipment.

BACKGROUND

Optical signal-to-noise ratio (OSNR) is a measure used to quantify the amount of optical noise interference in optical signals. This value is used as a figure of merit to describe the quality of an optical channel, and thus serves as an indicator of the performance of an optical communication system. The OSNR is also used to debug or otherwise isolate issues between an optical receiver and an optical network.

DESCRIPTION OF EXAMPLE EMBODIMENTS

Overview

According to one embodiment, a method is provided for deriving noise characteristics associated with an optical receiver. The method includes receiving, via an optical path of an optical receiver, an optical signal having a first power level, the optical signal carrying communications data. The optical signal is processed by the optical receiver. Based on the processing, a first noise measure is determined. A power level of the optical signal is then modified to a second power level. The modified optical signal is processed by the optical receiver, and a second noise measure is determined based on the modified optical signal. An ASE contribution to noise is then determined based on the first and second noise measures. An OSNR estimate is then derived based on the signal power and ASE contribution to noise.

Example Embodiments

Presented herein are embodiments generally directed to determination of an optical signal-to-noise measurement that excludes noise introduced by a coherent optical receiver.

For a coherent optical network, as a symbol rate increases and reaches channel bandwidth, an out of band OSNR measurement is no longer representative, and thus an in-band OSNR measurement at the coherent optical receiver becomes more important. In coherent optical receivers, an in-band optical signal-to-noise ratio (OSNR) value is not measured directly at the optical input but rather in a digital signal processor (DSP) or other processing device or function of the receiver. The measured noise at the DSP includes noise contributions not only from the optical link but also from various components inside the receiver, such as a local oscillator (LO) laser, transimpedance amplifier (TIA), an analog-to-digital converter (ADC), and/or other components.

These embodiments recognize that when employing higher-order modulation formats, the OSNR range of interest extends towards relatively higher OSNR values. At these relatively higher OSNR values, receiver noise becomes a greater percentage of total noise, and thus the measured noise becomes less sensitive to optical link noise. Thus, previous OSNR estimation techniques are no longer reliable.

One definition of an OSNR is signal power versus noise power. With this definition, there is a constant offset between $SNR_{ASE}$ and OSNR which depends on a receiver bandwidth ($BW_{RX}$).

$$OSNR = \frac{P_{SIG}}{\sigma^2_{ASE\_0.1nm}} = \frac{P_{DSP}}{\sigma^2_{ASE}} * \left(\frac{BW_{RX(nm)}}{0.1\,nm}\right) : OSNR = SNR_{ASE} + 10LOG_{10}\frac{BW_{RX(nm)}}{0.1\,nm} \quad (1)$$

where:
- $P_{SIG}$ is a power of an optical input signal as received at a coherent optical receiver,
- $P_{DSP}$ is a power of an electrical signal converted from the optical input signal as received at a digital signal processor of a coherent optical receiver,
- $\sigma^2_{ASE\_0.1nm}$ is a variance in ASE noise received at a coherent optical receiver over 0.1 nanometers bandwidth of a center wavelength,
- $\sigma^2_{ASE}$ is a variance in ASE noise over an optical receiver bandwidth,
- $BW_{rx}(\lambda)$ is an optical receiver bandwidth at a given wavelength ($\lambda$), and
- $SNR_{ASE}$ a signal-to-noise ratio that represents electrical signal power to ASE noise at the DSP.

In some embodiments, $SNR_{ASE}$ is determined based on a signal power received at a digital signal processor ($P_{DSP}$) and a variance of ASE noise ($\sigma^2_{ASE}$). Some embodiments determine $SNR_{ASE}$ according to Equation 2 below:

$$SNR_{ASE} = \frac{P_{DSP}}{\sigma^2_{ASE}} \quad (2)$$

However, a value of $\sigma^2_{ASE}$ cannot be directly measured in the DSP of a coherent optical receiver. Instead, generally what is obtained is a variance of all the noise within the signal received by the digital signal processor. This includes noise introduced by the optical receiver itself, along with ASE noise. This is represented by Equation (3) below:

$$\sigma_{TOTAL}^2 = \sigma_{ASE}^2 + \sigma_{RX}^2 \quad (3)$$

where:
- $\sigma_{TOTAL}^2$ is a total variance including ASE components of noise and receiver components of noise, and
- $\sigma_{RX}^2$ is a noise variance of noise introduced by receiver components.

To quantify $\sigma_{RX}^2$, some approaches calibrate or characterize an optical receiver and thus obtain an approximation for the receiver (RX) noise (e.g., $\sigma_{RX\_CAL}^2$). A disadvantage with this approach is that during operation, the actual receiver noise may differ from the $\sigma_{RX\_CAL}^2$ due to factors such as operating temperature, supply voltages or aging. Thus, the receiver noise experienced by the DSP is more accurately represented via Equation (4) below:

$$\sigma_{RX}^2 = \sigma_{RX\_CAL}^2 + \text{ERROR} \quad (4)$$

With the recognition of this additional error value, the ASE SNR can be represented as follows in Equation (5):

$$SNR_{ASE\_ESTIMATE} = \frac{P_{DSP}}{\sigma_{TOTAL}^2 - \sigma_{RX\_CAL}^2} = \frac{P_{DSP}}{\sigma_{ASE}^2 + \text{ERROR}} \quad (5)$$

This error between the calibration value ($\sigma_{RX\_CAL}^2$) and the actual RX noise ($\sigma_{RX}^2$) impacts the accuracy of the SNR estimate. This can be problematic when receiver noise is a relatively larger percentage of the total noise measurement.

Some embodiments presented herein isolate receiver noise from ASE noise by varying an input signal power level to an optical receiver. This contrasts with other approaches described above that rely on calibration during a manufacturing process to determine a noise correction factor. Because receiver noise is removed, a more accurate assessment of optical link quality is provided by the solutions presented herein. Furthermore, the disclosed approach is applied during nominal receiver operation (in its operating environment), and therefore compensates for any changes in receiver noise based on the receiver's environment and/or aging of the receiver over time.

Some embodiments presented herein characterize a plurality of components of the receiver noise by varying a local oscillator power level of the receiver. These embodiments characterize one or more of Shot noise (Poisson noise) from a receiver photodiode (PD), a relative intensity noise (RIN) from the oscillator itself, or thermal noise (TIA).

Figure 1A:
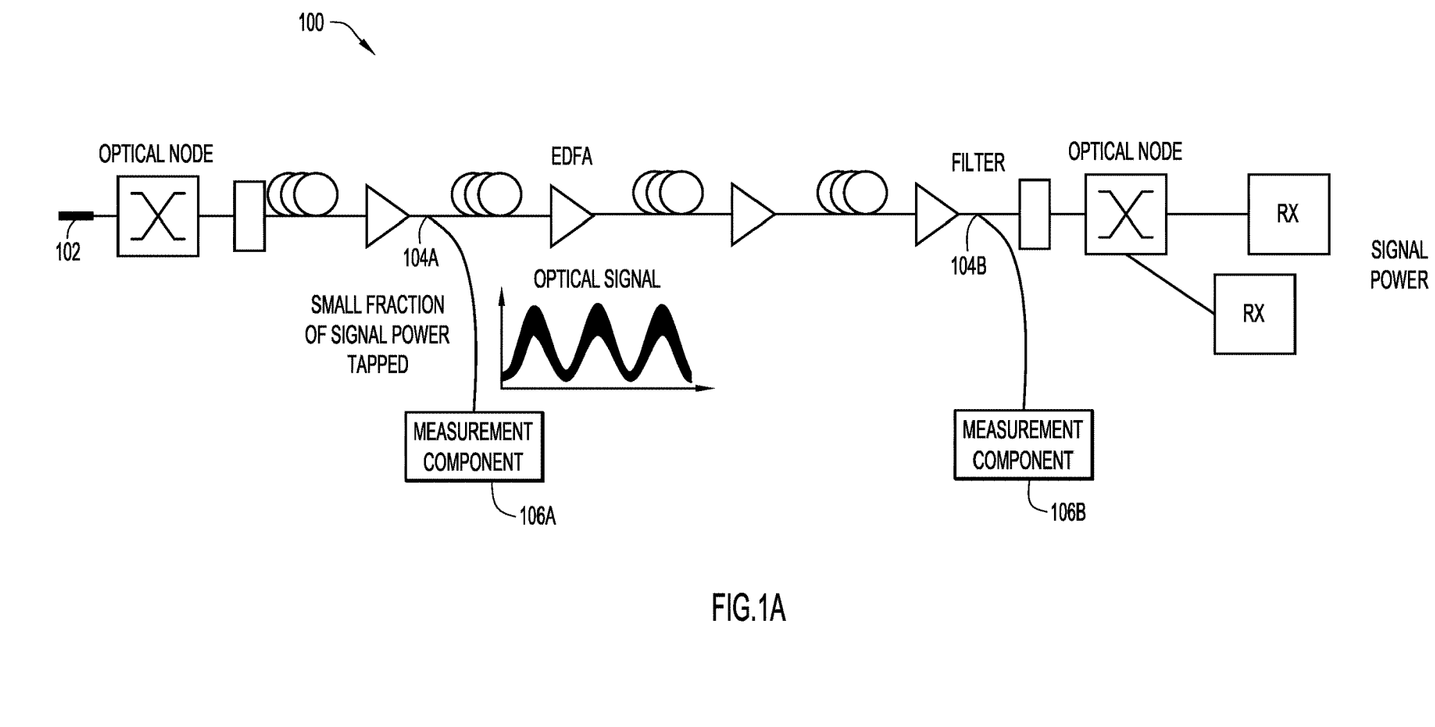
FIG. 1A illustrates a traditional method of measuring an optical signal-to-noise ratio.

FIG. 1A illustrates a traditional method of measuring an OSNR. FIG. 1A illustrates an optical communication system 100 that receives an optical signal via an optical signal input path 102. The optical communication system 100 includes two optical taps, shown as optical tap 104A and optical tap 104B. Each of the optical taps 104A and 104B divert a small portion of the optical signal to measurement components 106A and 106B respectively. Each of the measurement components 106A and 106B measure an optical signal power and out of band noise presented in the optical signal and then derive an OSNR value.

Figure 1B:
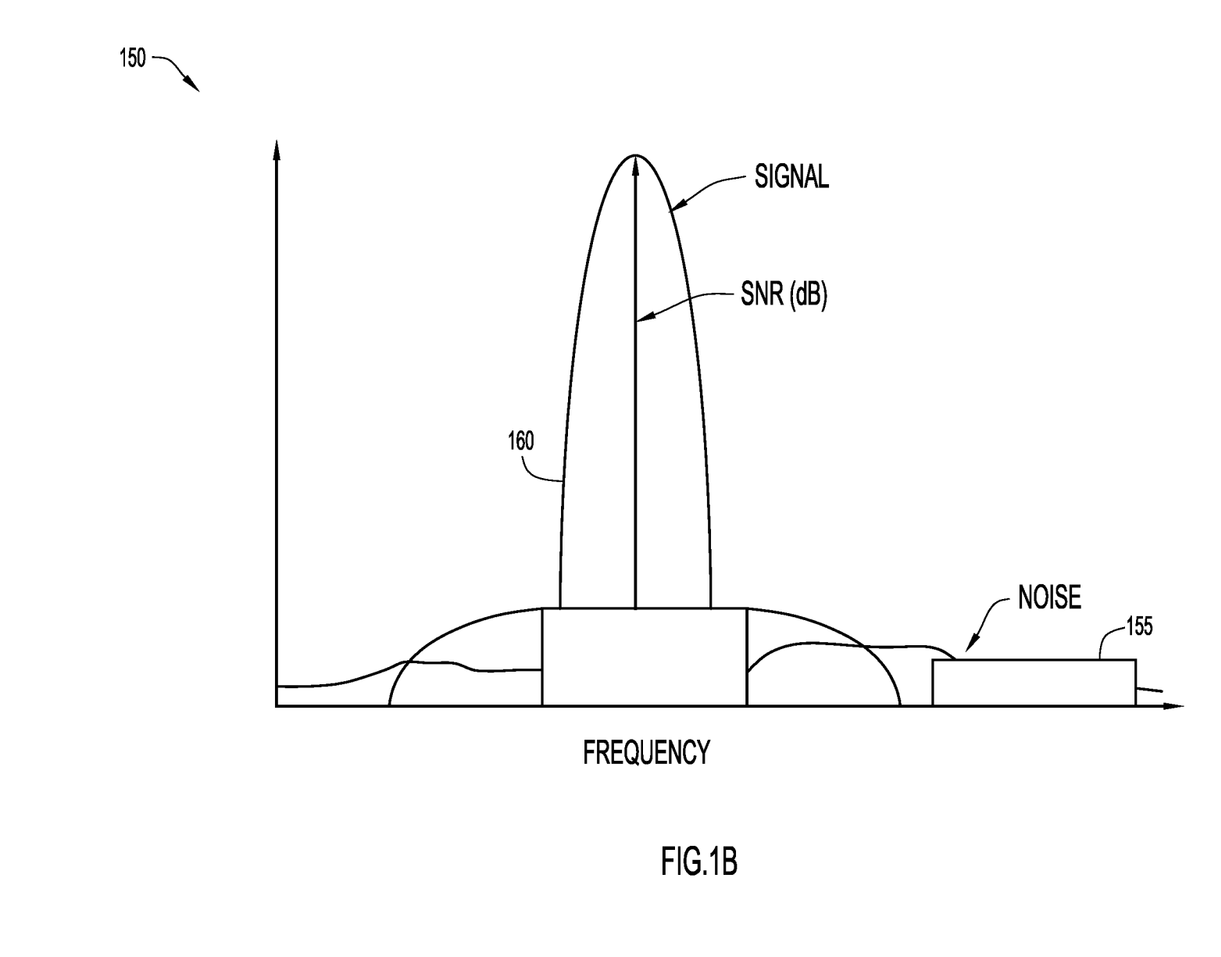
FIG. 1B illustrates frequency domain plot of an example optical signal for which an OSNR is to be measured according to the embodiments presented herein.

FIG. 1B illustrates a frequency domain plot of an example optical signal 150. FIG. 1B shows that the traditional method of measuring an OSNR of the optical signal 150, such as the measurement method illustrated in FIG. 1A, characterizes out-of-band noise 155. This out-of-band noise measurement is then used as a proxy for in-band noise present in the signal 160. However, with symbol rates becoming an increasing percentage of channel bandwidth, the traditional out-of-band OSNR measurement is no longer representative of noise experienced within an optical channel. Thus, in-band OSNR measurement at the optical receiver is becoming increasingly useful.

Figure 2:
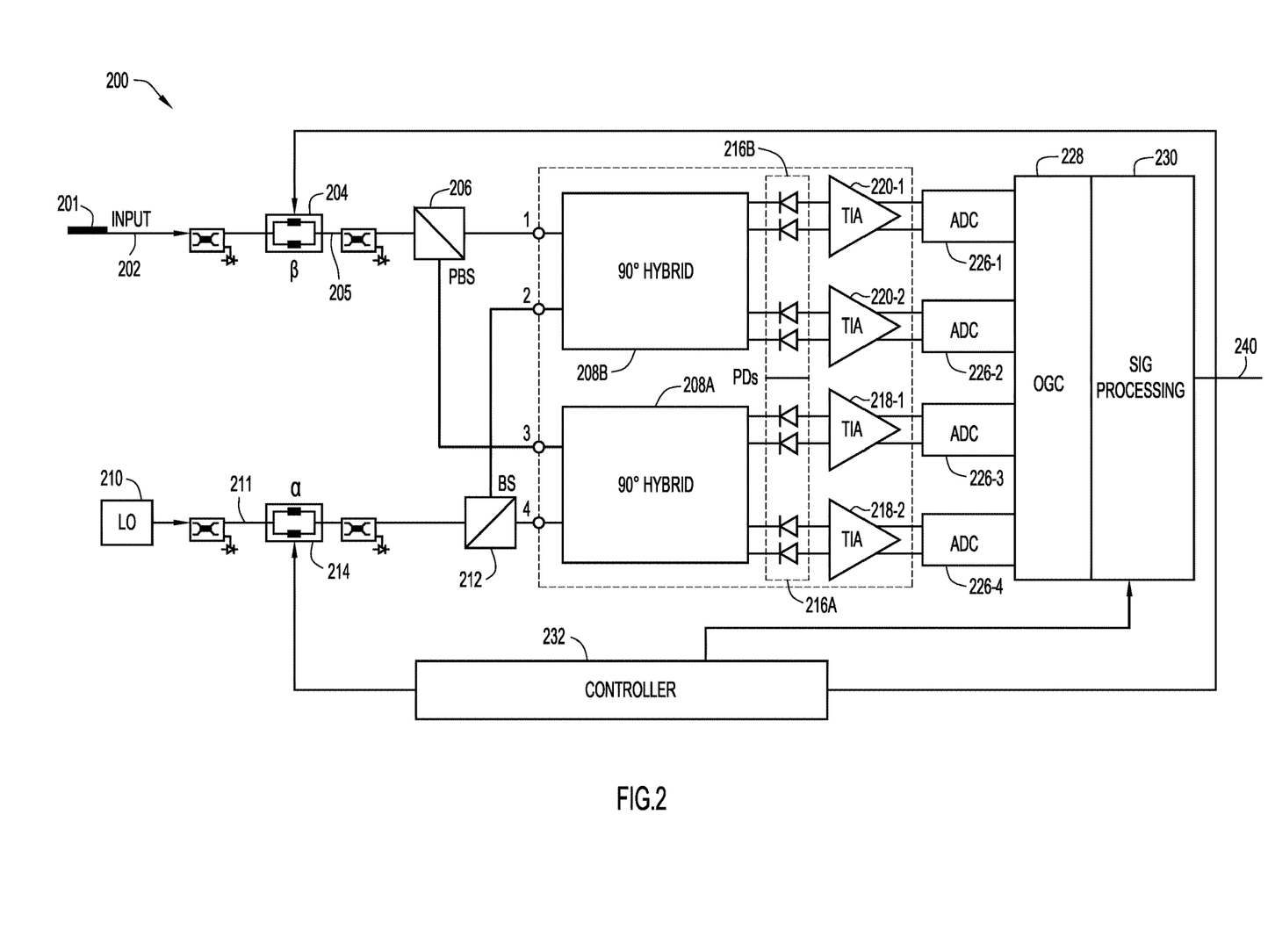
FIG. 2 is a block diagram of a coherent optical receiver configured to measure OSNR according to one or more of the disclosed embodiments.

FIG. 2 is a block diagram of an optical receiver 200 according to one or more of the disclosed embodiments. The optical receiver 200 includes an optical signal input 201 that receives an input optical signal from, for example, an optical fiber in an optical network. The optical input signal travels from the optical signal input 201 along an optical signal input path 202. The optical signal input path 202 operably connects the optical signal input 201 to a variable optical attenuator (VOA) 204, which is in turn is operably connected to an optical splitter 206. The optical splitter 206 spits an optical signal into two paths. The optical receiver 200 includes a first optical demodulator 208A and a second optical demodulator 208B. Each of the two optical demodulators are for a different optical polarizations. For example, the first optical demodulator 208A is for an "X" polarization and the second optical demodulator is for a "Y" polarization. Moreover, in some embodiments, each of the first optical demodulator 208A and the second optical demodulator 208B are 90° hybrid demodulators that receive as input two optical signals (signal (S) and local oscillator (LO)) and generate four output signals: S+LO, S−LO, S+jLO, S−jLO. When these signals are detected by two balanced receivers, both the amplitude and the relative phase information between the input signals can be extracted via balanced detection and digital signal processing. The use of 900 hybrid demodulators is not meant to be limiting as the techniques presented herein can be used with other types of optical demodulators in the optical receiver 200.

The optical receiver 200 further includes a local oscillator 210 that generates a local oscillator signal (LO1) 211 for the first optical demodulator 208A and the second optical demodulator 208B, via an optical splitter 212. As mentioned above, in one embodiment presented herein, a VOA 214 is provided to change the power level of the local oscillator LO1 from the local oscillator 210 to produce a local oscillator signal LO2 of a different power level, as described further below. Changing the power level of the local oscillator signal LO2 is employed in connection with some embodiments that determine components of receiver noise. These embodiments operate, in part, by eliminating ASE noise by the VOA 204 setting a level of the optical input signal to zero.

The first optical demodulator 208A produces four optical signals for the X polarization, namely, Sx+LOx, Sx−LOx, Sx+jLOx, Sx−jLOx. Similarly, the second optical demodulator 208B produces four optical signals for the Y polarization, namely, Sy+LOy, Sy−LOy, Sy+jLOy, Sy−jLOy. There is a photodetector bank 216A of four photodetectors (photodiodes) coupled to the output of the first optical demodulator 208A and a photodetector bank 216B of four photodetectors coupled to the output of the second optical demodulator 208B. The photodetector bank 216A converts the four output signals from the first optical demodulator 208A to electrical signals, and the photodetector bank 216B converts the four output signals from the second optical demodulator 208B to electrical signals.

There are two trans-impedance amplifies (TIAs) 218-1 and 218-2 coupled to the photodetector bank 216A and two TIAs 220-1 and 220-2 coupled to the photodetector bank 216B.

The outputs of the TIAs 218-1, 218-2, 220-1, and 220-2 are coupled to inputs of receive processing circuitry. The receive processing circuitry includes analog-to-digital converters (ADC) 226-1, 226-2, 226-3, and 226-4 respectively. Note that while the example coherent optical receiver 200 is shown without variable gain amplification (VGA) components, some embodiments include VGA components between the TIAs and the ADCs. The ADCs 226-1, 226-2, 226-3, and 226-4 convert these signals to digital signals. The receive processing circuitry also includes an offset and gain controller (OGC) 228 which, in some embodiments, applies offset and gain adjustments to the digital signals prior to further receive processing by the signal processor (DSP) 230 from which the data carried by the optical signal is decoded or recovered.

As described above, the optical signal input path 202 includes a (VOA 204. Some embodiments utilize an optical modulator instead of the VOA 204. Adjustment of the VOA 204/optical modulator allows for different power/modulation states to be applied to a received optical signal in the optical signal input path 202 according to at least two different settings $\beta_1$ and $\beta_2$, thus providing an ability to vary an optical signal power (or modulation) of an input optical signal to the optical receiver. The VOA 204 is controlled by a controller 232.

In the example optical receiver 200 of FIG. 2, a power level of the optical signal generally remains within an operating range of the optical receiver 200 when modified by the VOA 204. This avoids side effects introduced when the optical signal is modified such that it deviates from the operating range, such as clipping or sensitivity problems. Furthermore, the optical signal arriving via the optical signal input path 202 is continuously used for data communication during operations of the disclosed embodiments of OSNR measurement. For example, the optical receiver 200 continuously generates a digital output signal 240 based on the optical signal received via the optical signal input path 202 during operation of at least some of the disclosed embodiments of OSNR measurement. This ability to continuously use the optical receiver 200 applies even as the VOA 204 is modulating an input power of the optical signal coupled to the optical signal input path 202. The optical signal is processed by the first and second optical demodulators 208A and 208B, the photodetector banks 216A and 216B, the TIAs 218-1, 218-2, 220-1 and 220-2, (all of which contribute to the noise of the optical receiver 200) before being converted to digital signals by the respective ADC 226-1, 226-2, 226-3, 226-4, compensated by the OGC 228, and then processed at baseband by the signal processor 230. In some embodiments, at least the OGC 228 and signal processor 230 are included in a DSP of the optical receiver 200. Both signal power and noise power are characterized in an electrical domain after the signal processor 230. The characterization of a noise power over full RX bandwidth contrasts with some methods that rely on an optical tap to obtain a small narrow band portion of the full bandwidth of the optical signal, and determine narrow band, and/or out-of-band noise information, based on the tapped signal.

At least some of the disclosed embodiments rely on a relationship between a power of an electrical signal (converted from a received optical signal) and an amount of ASE noise estimated to be present in the received optical signal based on analysis of the electrical signal. Such a relationship is illustrated by Equations (6a and 6b) below:

$$\frac{P_{DSP}(\beta_1)}{P_{DSP}(\beta_1)} = \frac{\beta_1}{\beta_2} \quad (6a)$$

$$\frac{\sigma^2_{ASE}(\beta_1)}{\sigma^2_{ASE}(\beta_2)} = \frac{\beta_1}{\beta_2} \quad (6b)$$

where:
$P_{DSP}(\beta)$ is a power of an electrical signal converted from an optical input signal as received at a DSP of a coherent optical receiver when a power setting of the optical signal (e.g., via the VOA 204) is at setting J,
$\sigma^2_{ASE}(\beta)$ is a variance of an ASE noise contribution at power setting J,
$\beta_1$ is a first linear scaling factor of optical signal power, and
$\beta_2$ is a second linear scaling factor of the optical signal power.

As illustrated above by Equation (3) above, noise measured at a DSP (e.g. such as at the signal processor 230) includes ASE noise and RX noise. While $\sigma^2_{ASE}$ is a linear function to $\beta$, $\sigma^2_{RX}$ is not affected by $\beta$. Furthermore, during measurement of noise under different modulation conditions provided by the VOA 204, environmental impacts on noise remain stable. As a result, receiver induced noise (e.g., $\sigma^2_{RX}$) remains constant during modulation of the power of the input signal by the VOA 204. Therefore, the change in measured noise between two optical signals having different settings of the VOA 204 reflects a change in $\sigma^2_{ASE}$ without any contribution by $\sigma^2_{RX}$. This is shown below by Equation 7a, where the receiver noise ($\sigma^2_{RX}$) offset each other:

$$\sigma^2_{ASE}(\beta_1) - \sigma^2_{ASE}(\beta_2) = (\sigma^2_{Total}(\beta_1) - \sigma^2_{RX}) - (\sigma^2_{Total}(\beta_2) - \sigma^2_{RX}) \quad (7a)$$

$$= \sigma^2_{Total}(\beta_1) - \sigma^2_{Total}(\beta_2) \quad (7b)$$

Thus, according to each of Equations 7a and 7b, $\sigma^2_{ASE}$ can be represented as:

$$\sigma^2_{ASE}(\beta_1) = \frac{\beta_1}{\beta_1 - \beta_2} * (\sigma^2_{Total}(\beta_1) - \sigma^2_{Total}(\beta_2)) \quad (7c)$$

In some embodiments, a signal-to-noise ratio is determined according to Equation 8 below:

$$SNR_{ASE} = \frac{P_{DSP}(\beta_1)}{\sigma^2_{ASE}(\beta_1)} \quad (8)$$

These embodiments provide for exclusion of receiver induced noise in an OSNR determination, without introducing errors, as environmental factors that could cause variability in receiver induced noise do not generally change suddenly (e.g., between noise measurements at each of the $\beta_1$ and $\beta_2$ VOA settings).

The example optical receiver 200 of FIG. 2 is illustrated as including the OGC 228 to improve signal processing capability, although not all embodiments of the optical receiver 200 necessarily include the OGC 228. In some embodiments, the OGC 228 is included within the DSP, i.e., the signal processor 230, of the optical receiver 200. The OGC 228, along with VGA components that may be included in some embodiments, maintains a signal amplitude level when a power of the input signal within the optical signal input path 202 varies. Thus, for example, variability in the input signal level within the optical signal input path 202 introduced by the VOA 204 is compensated for, in at least some embodiments, by the OGC 228.

Influence of the OGC 228 ($\gamma$) can be modeled via Equation 9 below:

$$\beta * \gamma = 1 \rightarrow \gamma = \frac{1}{\beta} \quad (9)$$

where:
$\gamma$ is a linear gain of the OGC, and
$\beta$ is a linear scaling factor of optical signal power.
Given Equation 10 below:

$$P_{DSP}(\beta_1,\gamma_1)P_{DSP}(\beta_2,\gamma_2), \sigma_{ASE}^2(\beta_1,\gamma_1) = \sigma_{ASE}^2(\beta_2,\gamma_2) \quad (10)$$

In some embodiments, the receiver noise is a linear function of the OGC gain. Thus, in some embodiments, receiver noise can be represented in accordance with Equation 11 below:

$$\frac{\sigma_{RX}^2(\gamma_1)}{\sigma_{RX}^2(\gamma_2)} = \frac{\gamma_1}{\gamma_2} = \frac{\beta_2}{\beta_1} \quad (11)$$

Therefore:

$$\sigma_{Total}^2(\beta_1, \gamma_1) - \sigma_{Total}^2(\beta_2, \gamma_2) = \sigma_{RX}^2(\gamma_1) - \sigma_{RX}^2(\gamma_1) \quad (12)$$

$$= \frac{\beta_2 - \beta_1}{\beta_2} * \sigma_{RX}^2(\gamma_1) \quad (13)$$

The variance of the link noise is then determined, in some embodiments, based on Equation 14 below:

$$\sigma_{ASE}^2(\beta_1, \gamma_1) = \sigma_{Total}^2(\beta_1, \gamma_1) - \sigma_{RX}^2(\gamma_1) \quad (14)$$

$$= \frac{\beta_2 * \sigma_{Total}^2(\beta_2, \gamma_2) - \beta_1 * \sigma_{Total}^2(\beta_1, \gamma_1)}{\beta_2 - \beta_1} \quad (15)$$

As a result, the SNR is determined, in at least some embodiments, according to Equations 16 and/or 17 below:

$$SNR_{ASE} = \frac{P_{DSP}(\beta_1, \gamma_1)}{-\sigma_{ASE}^2(\beta_1, \gamma_1)} \quad (16)$$

$$= \frac{(\beta_2 - \beta_1) * P_{DSP}(\beta_1, \gamma_1)}{\beta_2 * \sigma_{Total}^2(\beta_2, \gamma_2) - \beta_1 * \sigma_{Total}^2(\beta_1, \gamma_1)} \quad (17)$$

Thus, in some embodiments, the signal processor 230 provides a signal-to-noise ratio determined in accordance with any of the embodiments described above to a user interface as a figure of merit for an operator to assess the quality of an optical link. In some embodiments, the signal processor 230 applies the computed signal-to-noise ratio to determine a modification of a modulation and/or coding scheme by optical nodes transmitting to the coherent optical receiver 200. For example, the computed signal-to-noise ratio can cause the signal processor 230 to send a notification to the optical transmitter that causes, in some embodiments, the optical transmitter to modify a first modulation rate to a second modulation rate, with the second modulation rate being a higher modulation rate than the first modulation rate, or the second modulation rate is, in some embodiments, a lower modulation rate than the first modulation rate. In some embodiments, a number of bits encoded per symbol is varied based on the computed signal-to-noise ratio. For example, a first number of bits per symbol are encoded by the optical transmitter, in some embodiments, when a signal-to-noise ratio is below a predetermined threshold, while a second number of bits per symbol are encoded when the signal to noise ratio is above the predetermined threshold, with the second number being larger than the first number. In some embodiments, the computed signal to noise ratio is provided to the optical transmitter, and the optical transmitter then adjusts the modulation and/or coding scheme based on the provided signal to noise ratio.

As discussed above, some embodiments provide for modulation of the local oscillator signal 211 to determine contributions of various receiver components to receiver noise. This is accomplished, in at least some embodiments, when a level of the optical input signal carried by the optical signal in the input path 205 of the optical receiver 200, after the VOA 204, is zero or substantially zero (e.g., $\beta$=0). When a level of the optical signal in the input path 205 is zero, the following Equation 18 holds:

$$\sigma_{ASE}^2 = 0 \quad (18)$$

Optical noise induced by a receiver includes noise introduced by a transimpedance amplifier (TIA), LO noise (RIN), and Shot noise. As discussed above, a variance of receiver noise can be expressed by $\sigma_{RX}^2(\alpha)$, with $\alpha$ representing a change in the linear scaling factor applied to the local oscillator signal output by the local oscillator 210. As receiver noise includes at least the noise components discussed above, receiver noise can be further represented via Equation 19 below:

$$\sigma_{RX}^2(\alpha) = \sigma_{RIN}^2(\alpha) + \sigma_{SHOT}^2(\alpha) + \sigma_{TIA}^2 + \sigma_{ADC}^2 \quad (19)$$

where:
$\sigma_{RX}^2(\alpha)$ is a variance of receiver induced noise under the change in a linear scaling factor applied to the local oscillator ($\alpha$),
$\sigma_{RIN}^2(\alpha)$ is a variance of RIN noise under the change in the linear scaling factor ($\alpha$),
$\sigma_{SHOT}^2(\alpha)$ is a variance in Shot noise under the change in the linear scaling factor ($\alpha$),
$\sigma_{TIA}^2$ is a variance in transimpedance amplifier noise independent of the change in the linear scaling factor ($\alpha$), and
$\sigma_{ADC}^2$ is a variance in analog to digital converter noise independent of the change in the linear scaling factor ($\alpha$).

Equation 19 demonstrates that at least some noise components depend on $\alpha$. In some embodiments, a variance of each noise component of an optical receiver is determined based on:

$$\sigma_{TIA}^2 = i_{TIA}^2 * \Delta f \quad (20)$$

where:
$i_{TIA}^2$ is a one sided differential input noise current density, and
$\Delta f$ is a single sided electrical filter bandwidth.

$$\sigma_{RIN}^2(\alpha) = 16 * R^2 * P_{LO}^2 * \alpha^2 * 2\Delta f * CMRR \quad (21)$$

where:
R is a responsivity of a photo diode,
$P_{LO}$ is a local oscillator power,
$\Delta f$ is a single sided electrical filter bandwidth,
$\alpha$ is a linear scaling factor of $P_{Lo}$, and
CMRR is a common mode rejection ratio.

$$\sigma_{SHOT}^2(\alpha) = 2 * q * R * P_{LO} * \alpha * \Delta f \quad (22)$$

where:
  q is an electron charge.

During a calibration, initialization or debugging phase, with power level of an optical signal in the input path 205 made to be zero, the ASE noise is eliminated, and the total noise $\sigma_{Total\_noinput}^2$ only includes noise contributed by various receiver components. When a local oscillator power level of an optical receiver is modulated, Equation 23 describes a relationship between noise contributions from various RX components at the different power levels $\alpha_1$ and $\alpha_2$:

$$\sigma_{Total\_noinput}^2(\alpha_1) - \sigma_{Total\_noinput}^2(\alpha_2) = \sigma_{RIN}^2(\alpha_1) - \sigma_{RIN}^2(\alpha_2) + \sigma_{SHOT}^2(\alpha_1) - \sigma_{SHOT}^2(\alpha_2) \quad (23)$$

In some embodiments, shot noise ($\sigma_{SHOT}^2$) is determined based on a measured photodetector/photodiode current:

$$\sigma_{SHOT}^2(\alpha) = 2 * q * P_{PD\_OUT} * \Delta f \quad (24)$$

$$\sigma_{RIN}^2(\alpha = 1) = \quad (25)$$

$$\frac{\sigma_{Total\_noinput}^2(\alpha_1) - \sigma_{Total\_noinput}^2(\alpha_2) - (\alpha_1 - \alpha_2) * \sigma_{SHOT}^2(\alpha_1)}{(\alpha_1^2 - \alpha_2^2)}$$

In some embodiments, thermal noise (due to the TIAs) and ADC noise are represented by Equation 26 below:

$$\sigma_{TIA}^2 + \sigma_{ADC}^2 = \sigma_{TOTAL\_noinput}^2 - \sigma_{RIN}^2 - \sigma_{SHOT}^2 \quad (26)$$

In some embodiments, responsivity of a photodiode is represented by Equation 27 below:

$$R = \frac{P_{PD\_OUT}}{P_{LO} * \alpha} \quad (27)$$

where:
  R a responsivity of a photo diode,
  $P_{Lo}$ is a power of a local oscillator that drives components of the optical receiver for which noise is being determined,
  $P_{pd\_out}$ is an output power of a photo detector.

In some embodiments, a common mode reject ratio (CMRR) is impacted by a power imbalance and/or skew mismatch. This affects LO RIN. Characterization of CMRR can assist an operator in understanding a source of receiver noise. In some embodiments, the CMRR is represented according to Equation 28 below:

$$CMRR = \frac{\sigma_{RIN}^2}{K * P_{PD\_OUT}^2 * 2\Delta f} \quad (28)$$

where:
  CMRR is a common mode rejection ratio,
  K is a constant value (e.g., 16), and
  $\Delta f$ a single sided electrical filter bandwidth.

Thus, in some embodiments, the signal processor 230 provides the determined characterization of any one or more of the contributions of noise introduced by one or more of the receiver components described above to a user interface for an operator to assess the performance of a coherent optical RX. In some embodiments, one or more of the contributions to noise is used to determine a modification to a modulation and/or coding scheme that may be used by an optical transmitter that is transmitting to the coherent optical receiver 200.

Figure 3:
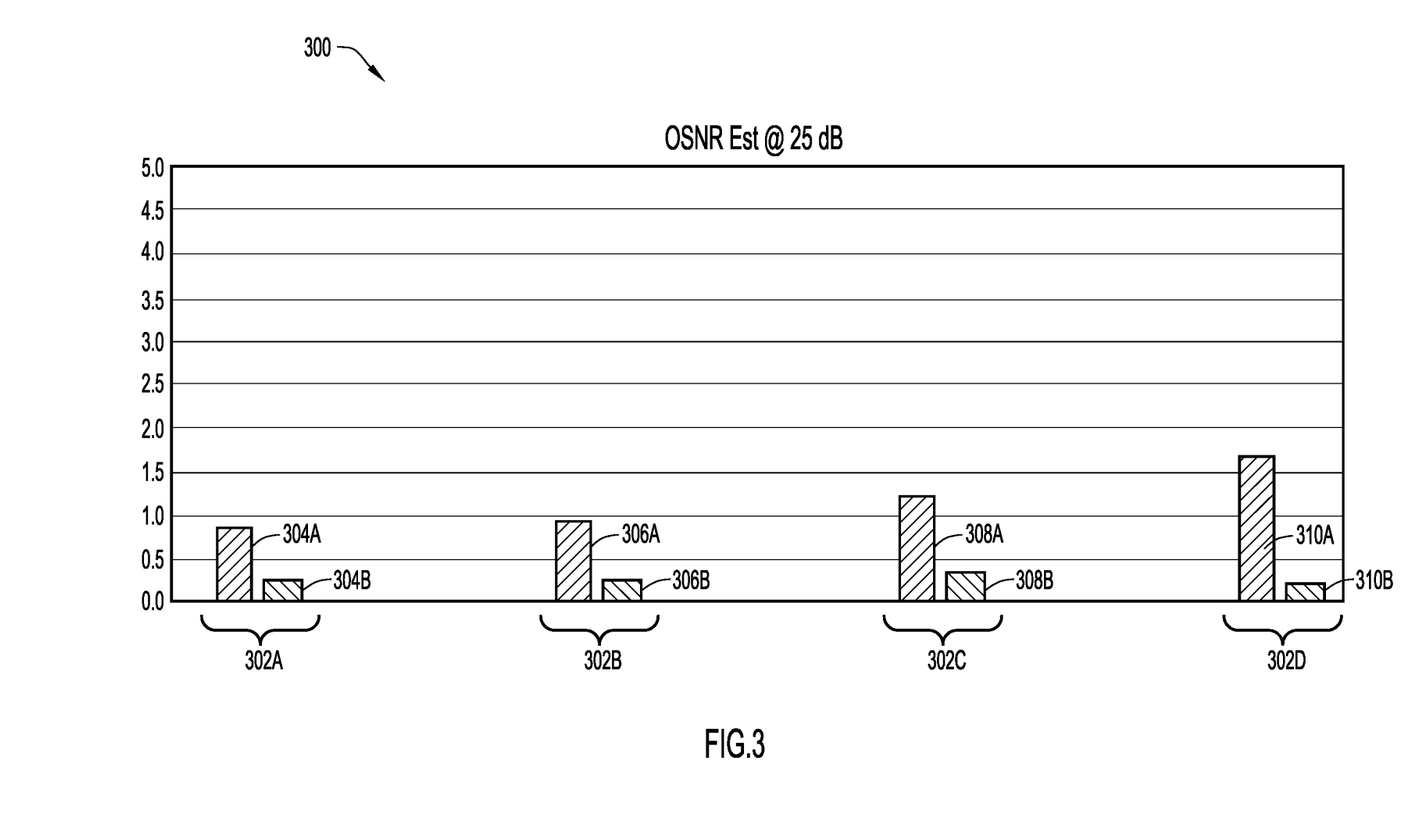
FIG. 3 is a bar graph contrasting an amount of error in OSNR measurements made using traditional methods and the techniques according to an example embodiment.

FIG. 3 is a graph 300 illustrating example differences in an amount of error in signal-to noise-ratios measured with an optical receiver that is configured to operate according to the embodiments presented herein. The results illustrated in FIG. 3 are derived from an optical receiver that had OGC enabled. The results are shown for four different power ranges, labeled as power ranges 302A, 302B, 302C and 302D, respectively. Error levels obtained when using a signal-to-noise measurement that does not exclude receiver noise are shown as error level 304A, error level 306A, error level 308A, and error level 310A. Error levels obtained when using a signal-to-noise measurement that excludes receiver noise according to an embodiment described above are shown as error level 304B, error level 306B, error level 308B, and error level 310B. These results demonstrate that changes in noise variance correlate well with input signal level changes. With 16 quadrature amplitude modulation (QAM), at a 25 decibel (dB) OSNR, the embodiments presented herein improve accuracy across the input power range. OSNR estimate methods that do not exclude receiver noise show an error of between 0.9 dB and ~1.7 dB, while an OSNR estimator according to the disclosed embodiments provide an error range between 0.2 dB and ~0.4 dB.

Figure 4:
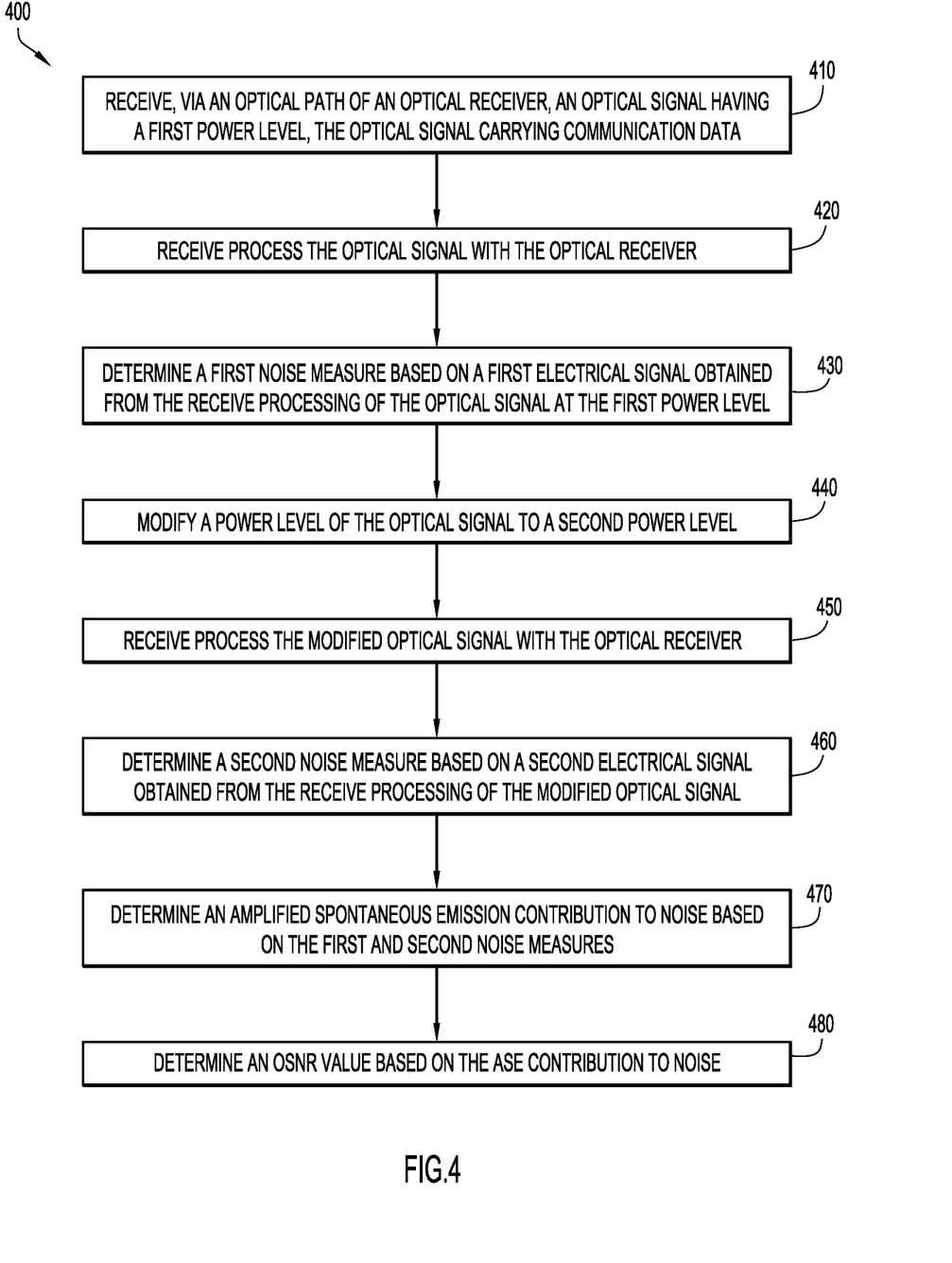
FIG. 4 is a flowchart of a method of applying a measurement of amplified spontaneous emission (ASE) noise that excludes receiver noise to an optical signal, according to an example embodiment.

FIG. 4 is a flowchart of a method of applying a measurement of ASE noise that excludes receiver noise to an optical signal. As discussed above, some of the disclosed embodiments modulate a power of an optical signal and exploit a relationship between the signal power and ASE noise to exclude receiver noise from an OSNR measurement. This more accurate assessment of optical link quality is used, in some embodiments, to debug or otherwise isolate issues between an optical receiver and an optical network from which the optical receiver is receiving transmitted optical signals. Thus, some embodiments display the determined OSNR noise measurement on a display panel of the optical receiver, or otherwise make the OSNR noise measurement available (e.g., some embodiments provide access to the computed OSNR noise measurement via a network API. In some embodiments, a modulation and/or coding scheme setting of an optical communications link is adjusted based on the ASE noise or the OSNR measurement, resulting in improved performance In some embodiments, one or more of the functions discussed below with respect to FIG. 4 and the method 400 are performed by hardware processing circuitry. For example, in some embodiments, instructions stored in a memory (e.g., one or more of the memory element(s) 604 discussed below with respect to FIG. 6) configure a hardware processor (e.g., the hardware processor(s) 602, also discussed below with respect to FIG. 6) to perform one or more of the functions discussed below with respect to FIG. 4 and method 400. In some embodiments, the method 400 is performed by the controller 232, discussed above with respect to FIG. 2. Reference is also made to FIG. 2 for purposes of the description of FIG. 4.

In operation 410, an optical signal is received, via an optical path. In some embodiments, the optical signal is encoding or carrying digital communications information (or data). The optical signal is received at a first power level. In some embodiments, operation 410 includes setting a position of a variable optical attenuator (e.g. the VOA 204) to provide for reception of the optical signal at the first power level (e.g. 1$i$).

In operation 420, the optical signal is receive processed by the optical receiver. In some embodiments, receive processing includes optically demodulating the optical signal, converting the optical signal to an analog electrical signal, amplifying (e.g., with a TIA and/or VGA) the analog electrical signal, and converting the analog electrical signal to a digital signal. For example, as discussed above, in some embodiments, an analog-to-digital converter converts an analog electrical signal to a digital signal. In some embodiments, the digital signal is used to provide continuity in the encoded digital communications information encoded by the optical signal. For example, an output signal (e.g. digital output signal 240) of the optical receiver is based, in at least some embodiments, on the digital signal.

Operation 430 determines, based on the receive processing of operation 420, one or more of a first electrical power measure of the electrical signal and a first noise measure. For example, as discussed above, with respect to Equations 1-7, in some embodiments, a variation in noise is computed based on a signal at the first power level (e.g., $P_{DSP}(\beta_1)$, $\sigma_{Total}^2(\beta_1)$), corresponding to the optical signal being at a first optical power level.

In operation 440, a power level of the optical signal is modified to a second optical power level. As discussed above with respect to FIG. 2, in some embodiments, control circuitry (e.g., the controller 232) of a receiver (e.g. optical receiver 200) controls a modulation device (e.g. the VOA 204) to vary a power of an optical signal.

In operation 450, the modified optical signal is receive processed, in a similar manner as the receive processing referred to above in connection with operation 420.

Operation 460 determines one or more of a second electrical power level of an electrical signal derived from the modified optical signal, and/or a second noise measure of the electrical signal based on the receive processing of the modified optical signal. Similar to the first noise measure determined in operation 430 above, some embodiments of operation 460 determine the second noise measure in accordance with the discussion above of Equations 1-7 (e.g., a variance of total noise, or $\sigma_{Total}^2(\beta_2)$).

In operation 470, an ASE noise of the optical signal is determined based on the first and second noise measures. In some embodiments, an ASE noise component of the noise measurements is determined based on a relative difference between the two noise measurements. For example, as discussed above, while varying power of an optical signal will modify an amount of ASE noise in the signal, an amount of receive noise included in the modified optical signal does not change relative to the optical signal before it was modified. Some embodiments of method 400 exploit this characteristic to isolate ASE noise from a total noise measurement. For example, as discussed above with respect to Equation 7, some embodiments derive an ASE noise based on the first and second noise measurements (e.g. $\sigma_{ASE}^2(\beta_1)$ $\sigma_{ASE}^2(\beta_2)$)

In operation 480, a an OSNR estimate (e.g., $SNR_{ASE}$) is derived based on the first electrical power measure $P_{DSP}(\beta_1)$ of operation 430 and an ASE noise contribution $\sigma_{ASE}^2(\beta_1)$ determined in operation 470, as discussed above with respect to Equation 8

In some embodiments, an optical signal is processed based on the ASE contribution to noise (e.g., $SNR_{ASE}$). As discussed above, some embodiments of optical receivers include an offset and gain compensation function (e.g. the OGC 228). Thus, some embodiments of method 400 determine ASE noise in accordance with the discussion of any one or more of Equations 9-17 above.

In some embodiments, a modulation and/or coding scheme (e.g., modulation type and/or data rate) is modified (e.g., based on the ASE noise contribution determined in operation 470). For example, in some embodiments, the optical receiver generates a notification and sends the notification to a transmitter of the optical signal. The notification recommends or otherwise indicates a change a modulation and/or coding scheme used for transmitting to the coherent optical receiver. The recommendation is based on the ASE contribution to noise of operation 470 and/or the OSNR determined in operation 480. Upon receiving the notification, the transmitter elects, in at least some circumstances, to modify the modulation and/or coding scheme (MCS) of the optical signal in accordance with the notification. Thus, for example, if the ASE contribution to noise and/or the OSNR determined by method 400 indicates the modulation and/or coding scheme can be changed to improve performance of the communication between the optical receiver and optical transmitter, such a change can be affected via the notification.

As discussed above, some embodiments display a signal to noise ratio (e.g., OSNR) derived from the ASE noise contribution on a display of the optical receiver. This provides information for an operator to make one or more adjustments to a network that includes the coherent optical receiver. In some embodiments, the signal to noise ratio is output using an alternative output method than display. For example, some coherent optical receivers implement network management interfaces (e.g. via simple network management protocol (SNMP)) that make one or more performance parameters available via the network management interface. These parameters can then be queried by a network management system. In some cases, alerts or traps are configured via the network management system, and can alert an operator when one or more performance parameters reach particular set thresholds. Thus, some embodiments expose a noise parameter derived from the ASE contribution to noise of operation 470 available in a manner analogous to that described here.

Some embodiments of method 400 are performed iteratively or periodically. For example, some optical receivers in accordance with disclosed embodiments will periodically reassess ASE noise and apply the most recent assessment to signal processing performed by the optical receiver. By periodically re-determining ASE noise that excludes noise contributions of the receiver itself, these embodiments ensure any changes in optical signal quality resulting from changes to the link quality itself and/or the optical receiver are appropriately characterized. Some embodiments of method 400 include one or more of the functions discussed below with respect to FIG. 5 and/or method 500.

Figure 5:
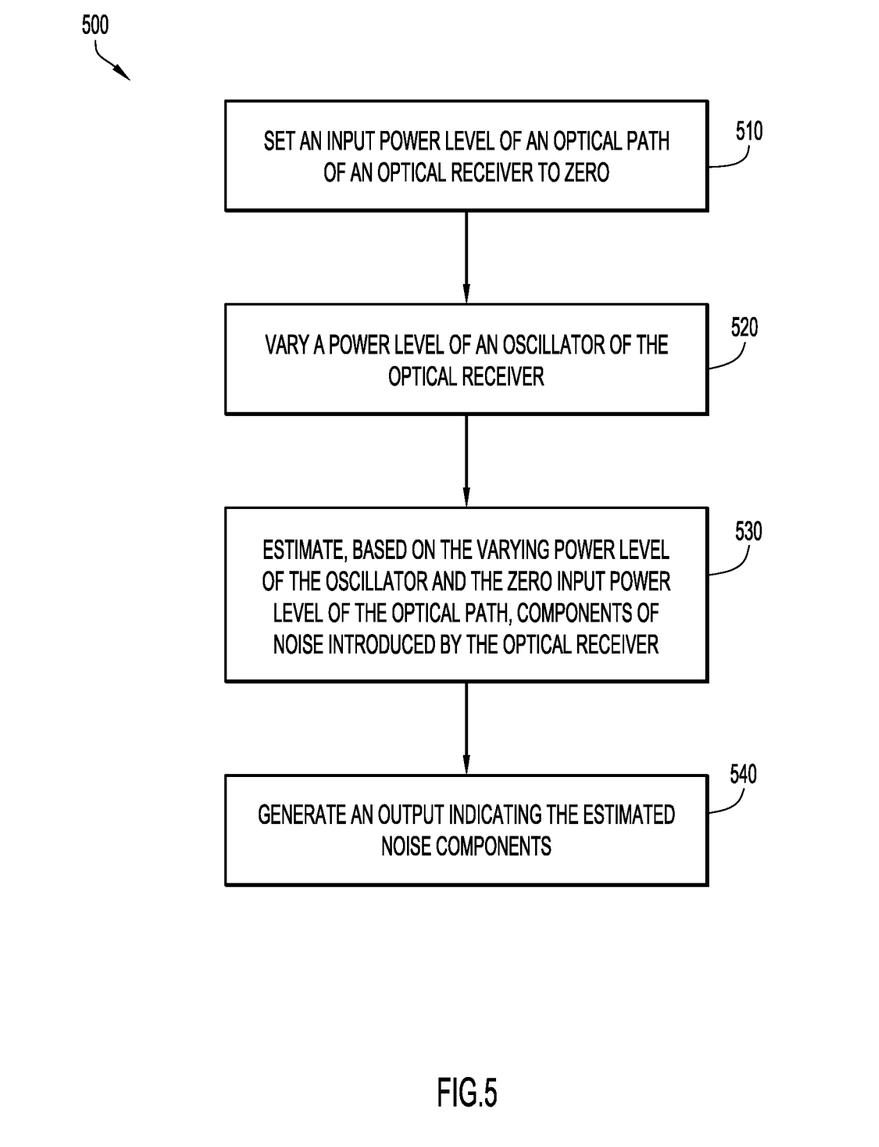
FIG. 5 is a flowchart of a method of deriving individual components of receiver noise of an optical receiver, according to an example embodiment.

FIG. 5 is a flowchart of a method of applying a measurement of optical receiver noise when an input optical signal is not present. As discussed above, some of the disclosed embodiments modulate a power of an Local Oscillator (LO) power level, and use the influence of the power change to characterize RX noise contributions from various noise sources including one or more of SHOT noise from a photodiode (PD), Relative Intensity Noise (RIN) generated by the LO or other components. This characterization enables an operator to assess the noise performance of a coherent optical receiver more accurately. In some embodiments, one or more functions of the method 500 are performed by the controller 232, discussed above with respect to FIG. 2.

In operation 510, an input power level of an optical path is set such that the input power level is zero. In some embodiments, a controller of an optical receiver (e.g., controller 232) moves an optical shutter of the receiver into a position such that any incoming optical signal is cut off, and thus is not processed by the optical receiver.

In operation 520, a power level of a local oscillator of the optical receiver is varied. Thus, operation 520 includes operating the local oscillator at a first power level and then at a second power level (e.g. represented by a in the discussion above with respect to any one or more of Equations 19-28).

Operation 530 estimates, based on the varying power level of the local oscillator and the zero input power level of optical signal in the optical signal input path, components of noise introduced by the optical receiver. For example, in some embodiments, one or more of thermal noise, shot noise (Poisson noise), analog to digital converter noise, or relative intensive noise (RIN) are estimated. In some embodiments shot noise is estimated based on a photo detector (PD) current. In some embodiments, one or more noise components are estimated in accordance with one or more of Equations 19-28, discussed above.

In operation 540, an output display is generated to indicate one or more of the estimates determined in operation 530. In some embodiments, the estimate(s) of component noise determined in operation 530 are provided to a user interface. These estimates of component noise are, in some cases, used by a technician for performance assessment of the receiver. In some embodiments, the estimates of component noise are used to adjust a digital output of the optical receiver. For example, a modulation and/or coding scheme of the optical receiver is adjusted, in some embodiments, based on a relationship between a level of RIN noise and a predetermined threshold. In some embodiments, the modulation and/or coding scheme is modified according to the approach discussed above with respect to method 400.

In brief, a notification is generated by the coherent optical receiver, in some embodiments, and sent to an optical transmitter that is in communication with the coherent optical receiver, and is generating the optical signal. The notification indicates the change in the modulation and/or coding scheme, and is based on one or more estimates of component noise derived by method 500. The optical transmitter then, at least in some circumstances, the modulation and/or coding scheme of the optical signal is changed based on the notification received from the coherent optical receiver. Such a change in modulation and/or coding scheme would occur after the power of the optical signal was restored to be within an operating range.

Some embodiments of method 500 include one or more of the functions discussed above with respect to FIG. 4 and method 400.

Figure 6:
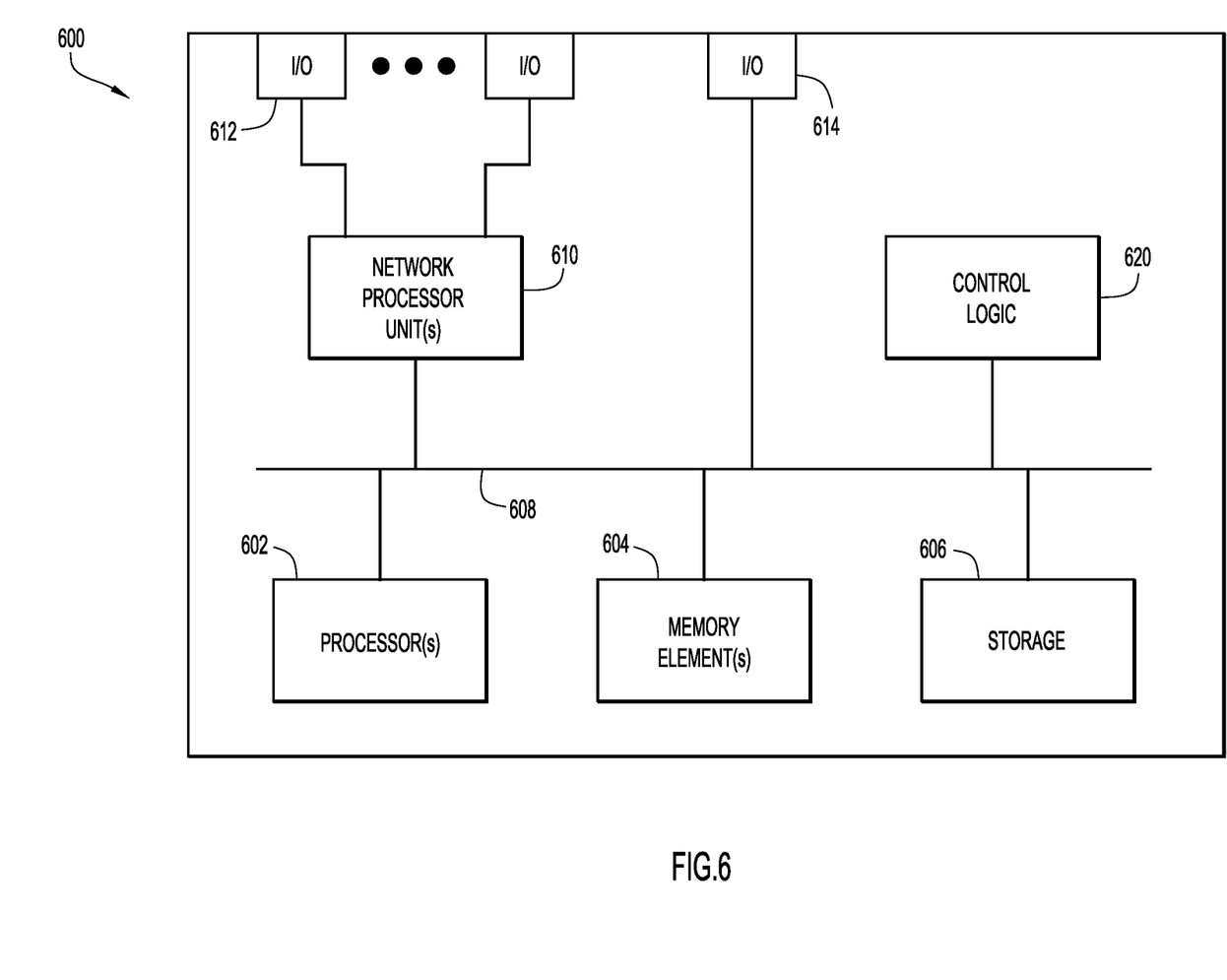
FIG. 6 is a hardware block diagram of a controller that may perform functions associated with operations discussed herein in connection with the techniques depicted in any one or more of FIG. 4 or 5.

FIG. 6 is a hardware block diagram of a controller 600 that may perform functions associated with operations discussed herein in connection with the techniques depicted in any one or more of FIG. 4 or 5. In various embodiments, any of the optical receivers discussed above implement a computing architecture analogous to that described below with respect to the controller 600.

In at least one embodiment, the controller 600 may include one or more hardware processor(s) 602, one or more memory element(s) 604, storage 606, a bus 608, one or more network processor unit(s) 610 interconnected with one or more network input/output (I/O) interface(s) 612, one or more I/O interface(s) 614, or control logic 620. In various embodiments, instructions associated with logic for controller 600 can overlap in any manner and are not limited to the specific allocation of instructions and/or operations described herein.

In at least one embodiment, processor(s) 602 is/are at least one hardware processor configured to execute various tasks, operations and/or functions for controller 600 as described herein according to software and/or instructions configured for controller 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with controller 600, and/or logic configured for memory element(s) 604 and/or storage 606. For example, any logic described herein (e.g., control logic 620) can, in various embodiments, be stored for controller 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of controller 600 to communicate in order to exchange information and/or data. Bus 608 can be implemented with any architecture designed for passing control, data and/or information between processors, memory elements/storage, peripheral devices, and/or any other hardware and/or software components that are configured for controller 600. In at least one embodiment, bus 608 is implemented as a fast kernel-hosted interconnect, potentially using shared memory between processes (e.g., logic), which can enable efficient communication paths between the processes.

In various embodiments, network processor unit(s) 610 may enable communication between controller 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between controller 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that are connected to controller 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the controller 600 serves as a user device as described herein. In some embodiments, the controller 600 supports a display having touch-screen display capabilities.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, Institute of Electrical and Electronics Engineers (IEEE) 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, an apparatus is provided comprising: optical receiver components configured to convert optical signals to electrical signals; and a controller coupled to the optical receiver components, the controller configured to: control the optical receiver components to receive process an optical signal at an optical input to produce a first electrical signal, the optical signal carrying communications data and having a first optical power level; determine a first noise measure based on the first electrical signal; control the optical receiver components to modify a power level of the optical signal to a second optical power level to produce a modified optical signal; control the optical receiver components to receive process the modified optical signal to produce a second electrical signal; determine a second noise measure based on the second electrical signal; determine an amplified spontaneous emission (ASE) contribution to noise based on the first noise measure and the second noise measure; and generate an optical signal-to-noise ratio (OSNR) based on the ASE contribution to noise.

In another form, a method is provided comprising: receiving, via an optical path of a coherent optical receiver, an optical signal carrying communications data, the optical signal having a first optical power level; receive processing the optical signal with the coherent optical receiver; determining a first noise measure based on a first electrical signal obtained from the receive processing the optical signal at the first optical power level; modifying a power level of the optical signal to a second optical power level to produce a modified optical signal that is provided via the optical path to the coherent optical receiver; receive processing the modified optical signal with the coherent optical receiver; determining a second noise measure based on a second electrical signal obtained from the receive processing of the modified optical signal; determining an amplified spontaneous emission (ASE) contribution to noise based on the first noise measure and the second noise measure; and generating an optical signal-to-noise ratio (OSNR) based on the ASE contribution to noise.

In still another form, one or more non-transitory computer readable storage media are provided comprising instructions that when executed configure receive processing circuitry of a coherent optical receiver to perform operations comprising: receiving, via an optical path of a coherent optical receiver, an optical signal carrying communications data, the optical signal having a first optical power level; receive processing the optical signal with the coherent optical receiver; determining a first noise measure based on a first electrical signal obtained from the receive processing the optical signal at the first optical power level; modifying a power level of the optical signal to a second optical power level to produce a modified optical signal that is provided via the optical path to the coherent optical receiver; receive processing the modified optical signal with the coherent optical receiver; determining a second noise measure based on a second electrical signal obtained from the receive processing of the modified optical signal; determining an amplified spontaneous emission (ASE) contribution to noise based on the first noise measure and the second noise measure; and generating an optical signal-to-noise ratio (OSNR) based on the ASE contribution to noise.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, via an optical path of a coherent optical receiver, an optical signal carrying communications data, the optical signal having a first optical power level;
   processing the optical signal with the coherent optical receiver;
   determining a first noise measure based on a first electrical signal obtained from processing the optical signal at the first optical power level;
   modifying a power level of the optical signal to a second optical power level to produce a modified optical signal that is provided via the optical path to the coherent optical receiver;
   processing the modified optical signal with the coherent optical receiver;
   determining a second noise measure based on a second electrical signal obtained from processing the modified optical signal;
   determining an amplified spontaneous emission (ASE) contribution to noise based on a difference between the first noise measure and the second noise measure and a ratio computed based on the first optical power level and the second optical power level; and
   generating an optical signal-to-noise ratio (OSNR) based on the ASE contribution to noise.

2. The method of claim 1, further comprising, based on the OSNR, sending a notification to a transmitter to modify a modulation and/or coding scheme used for transmitting to the coherent optical receiver.

3. The method of claim 1, further comprising decoding digital data based on the communications data carried by the optical signal at the first optical power level and at the second optical power level.

4. The method of claim 1, further comprising:
   determining a first electrical power level based on the first electrical signal; and
   determining a second electrical power level based on the second electrical signal, wherein the ASE contribution to noise is further based on a ratio between the first electrical power level and a difference between the first electrical power level and the second electrical power level.

5. The method of claim 4, wherein the first and second noise measures are based on an output of an offset and gain controller (OGC), and wherein the ASE contribution to noise is determined based on an influence of the OGC at each of the first and second electrical power levels.

6. The method of claim 1, wherein modifying the power level of the optical signal comprises adjusting a variable optical attenuator or an optical modulator within the optical path of the coherent optical receiver.

7. The method of claim 1, wherein the first optical power level and the second optical power level are within an operating range of the coherent optical receiver.

8. The method of claim 1, further comprising:
   setting a power of the optical signal to substantially zero; and
   estimating a plurality of noise components introduced by the coherent optical receiver based on a change in noise at two power levels of a local oscillator (LO) signal.

9. The method of claim 8, wherein the estimating of the plurality of noise components comprises estimating one or more of: thermal noise, relative intensity noise (RIN) or shot noise.

10. The method of claim 8, further comprising:
    processing the optical signal set to substantially zero power, with the coherent optical receiver; and
    determining a third noise measure based on a third electrical signal obtained from the processing of the optical signal set to zero power, wherein the estimating of the plurality of noise components is based on a difference between the first noise measure and the third noise measure.

11. The method of claim 8, wherein the estimating of the plurality of noise components is further based on a ratio between a first electrical power level based on the first electrical signal and a difference between a first LO power level of the two power levels and a second LO power level of the two power levels.

12. The method of claim 8, further comprising changing a power level of the LO signal by adjusting a variable optical attenuator or an optical modulator within a LO path of the coherent optical receiver.

13. An apparatus comprising:
    optical receiver components configured to convert optical signals to electrical signals; and
    a controller coupled to the optical receiver components, the controller configured to:
      control the optical receiver components to process an optical signal at an optical input to produce a first electrical signal, the optical signal carrying communications data and having a first optical power level;
      determine a first noise measure based on the first electrical signal;
      control the optical receiver components to modify a power level of the optical signal to a second optical power level to produce a modified optical signal;
      control the optical receiver components to process the modified optical signal to produce a second electrical signal;
      determine a second noise measure based on the second electrical signal;
      determine an amplified spontaneous emission (ASE) contribution to noise based on a difference between the first noise measure and the second noise measure and a ratio computed based on the first optical power level and the second optical power level; and
      generate an optical signal-to-noise ratio (OSNR) based on the ASE contribution to noise.

14. The apparatus of claim 13, wherein the optical receiver components include a variable optical attenuator or an optical modulator that is configured to, based on controls from the controller, modify the power level of the optical signal.

15. The apparatus of claim 13, wherein the controller is further configured to:
    control the optical receiver components to set a power of the optical signal to substantially zero; and
    estimate a plurality of noise components introduced by the optical receiver components based on a change in noise at two power levels of a local oscillator (LO) signal.

16. The apparatus of claim 13, wherein the controller is configured to:

determine a first electrical power level based on the first electrical signal and determine a second electrical power level based on the second electrical signal, wherein the ASE contribution to noise is further based on a ratio between the first electrical power level and a difference between the first electrical power level and the second electrical power level.

17. One or more non-transitory computer readable storage media comprising instructions that when executed configure processing circuitry of a coherent optical receiver to perform operations comprising:

receiving, via an optical path of a coherent optical receiver, an optical signal carrying communications data, the optical signal having a first optical power level;

processing the optical signal with the coherent optical receiver;

determining a first noise measure based on a first electrical signal obtained from the processing the optical signal at the first optical power level;

modifying a power level of the optical signal to a second optical power level to produce a modified optical signal that is provided via the optical path to the coherent optical receiver;

processing the modified optical signal with the coherent optical receiver;

determining a second noise measure based on a second electrical signal obtained from the processing of the modified optical signal;

determining an amplified spontaneous emission (ASE) contribution to noise based on a difference between the first noise measure and the second noise measure and a ratio computed based on the first optical power level and the second optical power level; and generating an optical signal-to-noise ratio (OSNR) based on the ASE contribution to noise.

18. The one or more non-transitory computer readable storage media of claim 17, the operations further comprising:

determining a first electrical power level based on the first electrical signal; and determining a second electrical power level based on the second electrical signal, wherein the ASE contribution to noise is further based on a ratio between the first electrical power level and a difference between the first electrical power level and the second electrical power level.

19. The one or more non-transitory computer readable storage media of claim 17, the operations further comprising:

decoding digital data based on the communications data carried by the optical signal at the first optical power level and at the second optical power level.

20. The one or more non-transitory computer readable storage media of claim 17, the operations further comprising:

sending, based on the OSNR, a notification to a transmitter to modify a modulation and/or coding scheme used for transmitting to the coherent optical receiver.

* * * * *